United States Patent
Reponen et al.

[11] Patent Number: 5,949,086
[45] Date of Patent: Sep. 7, 1999

[54] METHOD AND DEVICE FOR MEASURING THE CHARACTERISTIC QUANTITIES OF A LOG

[75] Inventors: Jorma Reponen, Jyvaskyla; Mauno Kauppinen, Saynatsalo, both of Finland

[73] Assignee: Vision Systems Oy, Jyvaskyla, Finland

[21] Appl. No.: 08/945,815

[22] PCT Filed: Apr. 29, 1996

[86] PCT No.: PCT/FI96/00228

§ 371 Date: Oct. 28, 1997

§ 102(e) Date: Oct. 28, 1997

[87] PCT Pub. No.: WO96/34251

PCT Pub. Date: Oct. 31, 1996

[30] Foreign Application Priority Data

Apr. 28, 1995 [FI] Finland ................................. 952028

[51] Int. Cl.$^6$ ........................................................ G01N 21/30
[52] U.S. Cl. .............................. 250/559.25; 250/223 R; 356/385; 144/357
[58] Field of Search ......................... 250/223 R, 559.19, 250/559.25; 356/372, 384–386, 394; 144/357; 83/365

[56] References Cited

U.S. PATENT DOCUMENTS

| | | | |
|---|---|---|---|
| 4,300,836 | 11/1981 | Holmes et al. | 250/559.25 |
| 4,301,373 | 11/1981 | Sjödin | 250/559.25 |
| 4,500,203 | 2/1985 | Bieringer | 356/394 |
| 5,544,757 | 8/1996 | Geiger et al. | 250/223 R |

*Primary Examiner*—Stephone Allen
*Attorney, Agent, or Firm*—Fildes & Outland, P.C.

[57] ABSTRACT

The object of the invention is a method and apparatus for measuring the characteristic quantities, such as e.g., the length, diameter, volume, and defects of a log (1) or similar in which method the log (1) is moved at a known speed past a photographing station. The photographing station consists of at least one plane of light (4.1) that transects the direction of travel of the log and a video camera (3) set at a fixed angle (a) to this, and a computer apparatus (6), which is arranged to calculate and collect sequential images of a group of surface points ($x_l$, $y_l$, $z_l$; . . . ; $x_n$, $y_n$, $z_n$) of a three-dimensional model depicting the surface of the log as the log moves through the plane of light, in which the coordinates of each point are calculated with the aid of the geometry of the photography. The log (1) is transported transversely to the direction of the conveyor, the log then traveling along an imagined plane, while the plane of light (4.1) is arranged to intersect the imagined plane of movement of the log at a right-angle. A subgroup of points ($y_n$ ($x_1$, $z_1$; . . . ; $x_L$, $z_L$)) of the cross section is interpolated at regular intervals in the longitudinal direction of the log from the group of points ($x_l$, $y_l$, $z_l$; . . . ; $x_n$, $y_n$, $z_n$), and the radius ($y_n$; $r_n$) of the circle describing the cross section and the location of the center-point ($y_n$, $x_n$, $z_n$) are calculated from each subgroup obtained, and calculatory sequential elements, for example cylinders ($c_l$ . . . $c_m$), from which the desired quantities are calculated, are formed with the aid of the circles obtained.

9 Claims, 4 Drawing Sheets

METHOD AND DEVICE FOR MEASURING THE CHARACTERISTIC QUANTITIES OF A LOG

The object of the invention is a method and apparatus for measuring the characteristic quantities, such as e.g. the length, diameter, volume, and defects, of a log or similar, in which method the log is moved at a known speed past a photographing station, which photographing station consists of at least one plane of light that transects the direction of travel of the log and a video camera set at a fixed angle to this, and computer apparatus, which is arranged to calculate and collect sequential images of a group of surface points of a three-dimensional model depicting the surface of the log as the log moves through the plane of light, in which the coordinates of each point are calculated with the aid of the geometry of the photography, according to which the each point formed by the plane of light on the surface of the log is at the intersection of the angle of viewing and the plane of light.

Finnish Patent 64300 describes a method and apparatus for determining the length of logs. In it, the logs are moved through a photo-electric trip device. The photography takes place from the opposite side, when the log cuts the device. The protruding parts of the log remain in view, and by this means it is possible to calculate the length of the log. With the aid of this method the overall length of the log is obtained, which is also inaccurate if there are defects in the log. The apparatus is generally not able to recognise a situation in which two logs have come into the same section of the conveyor.

In addition to the length of the log, it is wished to know a great number of other characteristic quantities, which include the diameter at various points in the log, the total volume of the log and the amount and location of defective parts. For example, the end of the log may be too thin in length, or the log may be from a crooked-grown tree, i.e. it may be considerably warped, which is also essential to know for further processing.

U.S. Pat. No. 4,705,401 describes a general method for digitalizing the surface of a three-dimensional object. According to the publication, the object is rotated and lit by two light sources, which form two light planes lying on either side of the line of photography, being limited at the object by its surface. Each plane of light forms an observable line on the surface of the object. The location of each point on the line of light can be seen in the angle of view in the camera of each point, when the coordinates can be calculated with the aid of the geometry of the photography. As the object is rotated, a series of points is created from a series of pictures, which can be combined, once the speed of rotation of the object is known.

The intention of this invention is to create a new kind of method and apparatus for measuring the characteristic quantities of a log or similar longitudinal object. The characteristic features of the method in accordance with the invention are described in the accompanying Patent claim 1, and the characteristic features of an apparatus in accordance with the invention are described in Patent claim 7. The measurement method in accordance with the invention is extremely precise, when suitable filters are used, i.e. when the points remaining outside tolerance areas according to certain criteria are removed. Points of this kind outside the trunk are produced by such things as branches, loose pieces of bark, and possible interference. In addition, the position of the supports is known exactly and their influence can easily be removed from the image. Points that clearly cause discontinuity can also be removed from the group of points. A considerable number of points depicting the surface remains in any event, to which curve elements corresponding to the cross-sectional circle can be fitted. The remaining points in each subgroup define the cross-sectional circle and its centre point, when the entire log can be depicted as a series of cylinders, which are formed by the calculated cross-sectional circles. The total volume of the log is simply the sum of the volumes of these cylinders. It is simple to determine the amount of defective material by calculating the sum of the lengths of the cylinders that are less than the diameter criterion. The warping of the log is expressed by the deviation from a straight line of a line running through the centre points of the calculated circles.

In what follows, the invention is described by reference to the accompanying Figures, which are concerned with one apparatus according to the invention and the method of calculation used in it.

Figure 1:
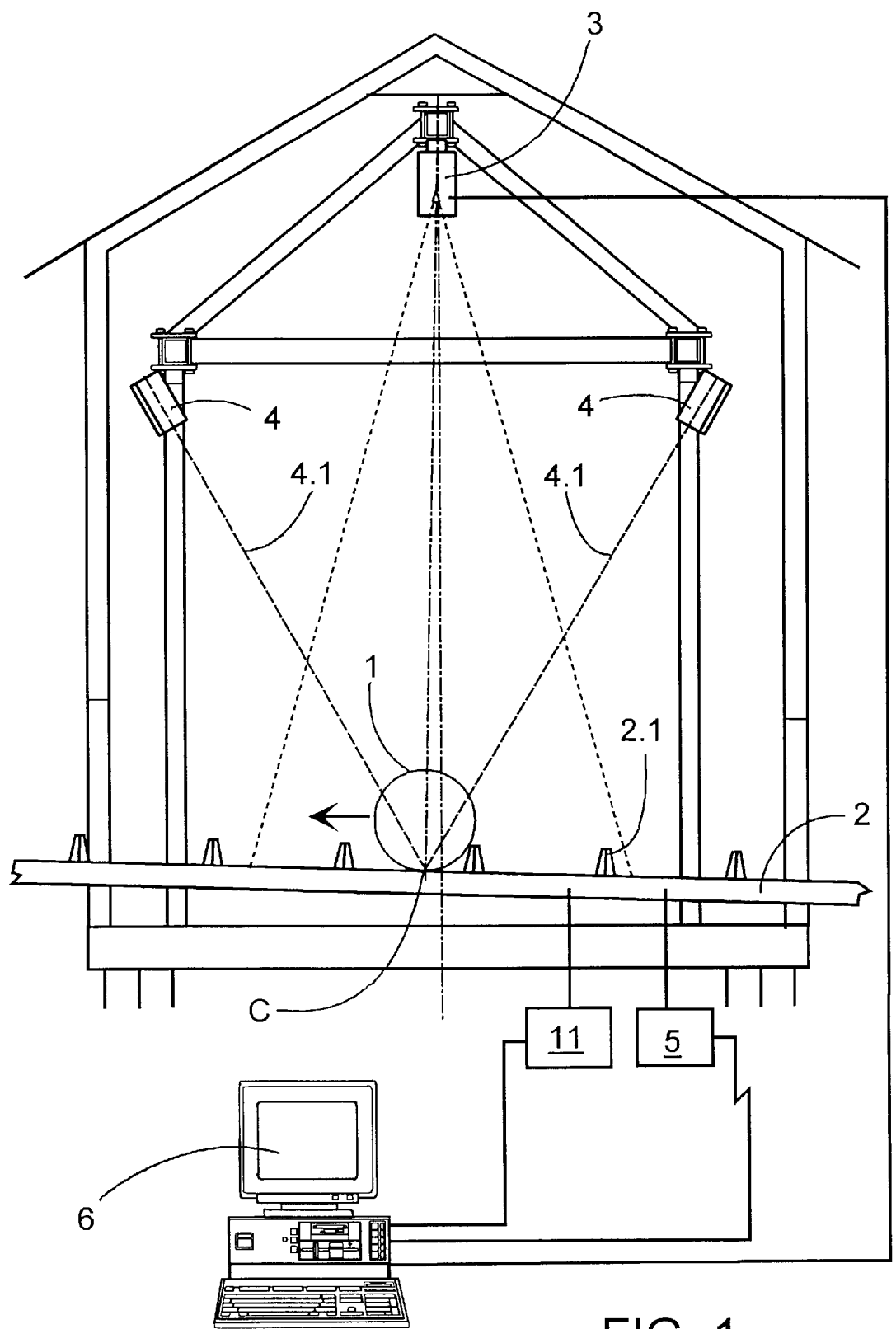
FIG. 1 shows the photography arrangement set across the conveyor apparatus, seen from the side.

The photography station is located above the conveyor line 2 under a canopy to protect it from the sun. The conveyor line 2 transports the logs 1 through the photography station 1 by means of supports 2.1, when planes of laser light 4.1 from laser light transmitters sweep over the entire upper surface of the log. An attempt is made to sort the logs onto the log chain conveyor 2 in such a way that there is only one log in each gap between supports, but sometimes a second log also finds its way into the gap, which should be noticed by the apparatus. The log chain conveyor 2 is set at a slight upwards angle (1–5°), when the logs 1 rest lightly on the right-hand side of the gap between the supports, according to FIG. 1. The apparatus includes a speed detector 5 and computer apparatus 6, to which the cameras are connected.

Figure 2:
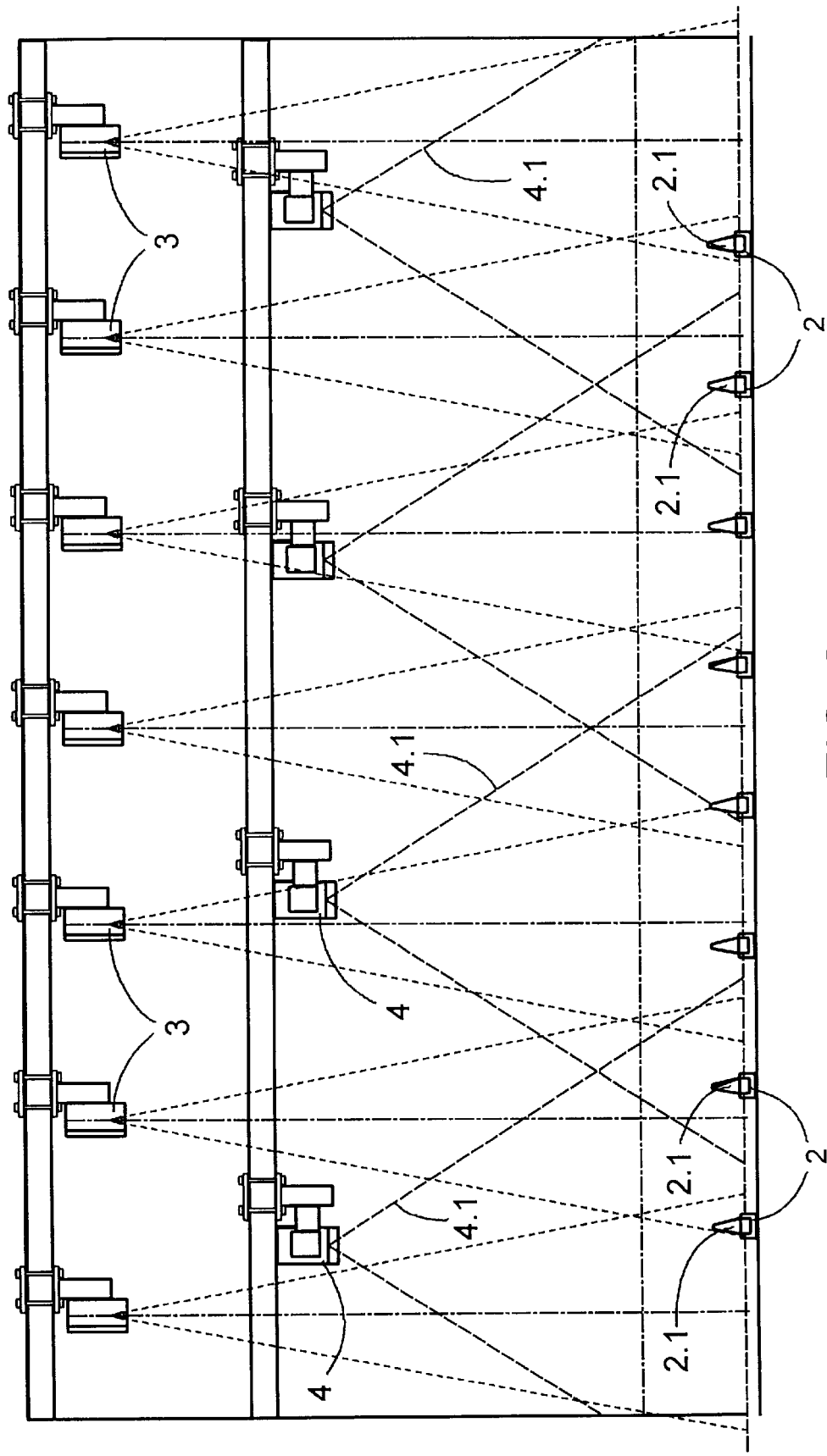
FIG. 2 shows the apparatus in FIG. 1 seen from the direction of travel of the conveyor.

FIG. 2 shows the location of the cameras 3 (7 pcs) and the laser transmitters (2×4 pcs) 7 metres above the coveyor bed. The cameras 3 are set at a height of 3.3 metres. Each camera measures a width of 512 pixels (50 images/s), but the image areas of the cameras overlap to some extent. There are laser light transmitters 4 on either side of the cameras (at an angle of 25–35°), the planes of infrared light 4.1 of which also interlap mutually. Both the cameras 3 and the laser light transmitters 4 on either side of them with their planes 4.1 are set on precisely the same lines, which are shown in FIG. 1.

The cameras are of the type JAI 1560, manufactured by JAI Oy, Finland. The laser light transmitters are of the type HAM4.8/2505; Power Technology Inc., USA. Pulse sensor 09500001-2500 manufactured by Leine & Linden, with connector card CIO-CTR 05 Counter Timer; Computer Boards, is used as the speed detector, and filming is started by means of photo-electric cell transmitter-receiver pair SMT500 NG5-SMR5525; Telco. The image-processing card, i.e. the camera connection, is made by the applicant, model BIP1024C ver 2.0. The digitalizes the analog video signals of the camera. The computer apparatus comprises a PCQT Light Pentium 100 MHz, manufacturer PCQT Svenska Ab.

Using the apparatus described it is possible to use a conveyor speed in the range 0.15–0.3 m/s. The laser light sources form an infrared right ray 7 m long and 5 mm wide, which sweeps over the log as it penetrates the curtain of light. In a typical picture, about 20,000 measurement points are obtained from a log 3 m and 12 cm thick. The measurement system determines the shape of the upper half of the log (about 180°) on the basis of the image data.

Photography is started by an impulse given by the conveyor. Sensor 11, which is shown diagrammatically in FIG. 1), installed for this purpose, starts the photography when the log arrives at the first laser light plane. When photography has finished, the light ray returns to the initial position, which is marked in the FIGURE with the letter C. The starting of the photography can also be implemented with the aid of an image analysis.

Figures 3A, 3B:
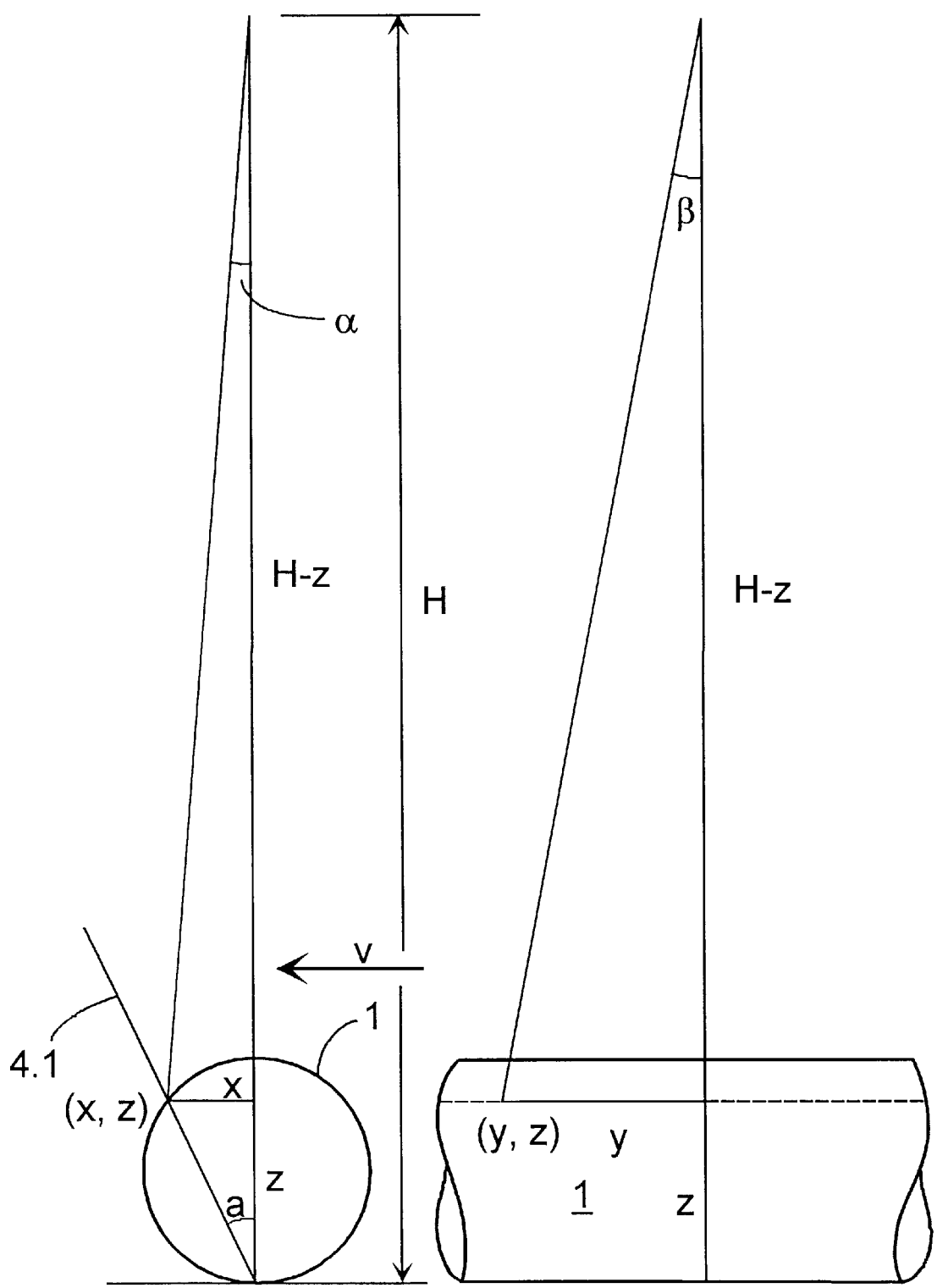
FIGS. 3a & 3b show the geometry of the photography.

In FIGS. 3*a* and 3*b*, the angle of view is marked with the reference numbers $\alpha$ and $\beta$, with $\alpha$ signifying the angle of view in the lateral projection, and angle $\beta$ the angle of view seen from the direction of the conveyor. The distance of the camera from the conveyor bed is marked by the latter H and the coordinates of the point being calculated by x, y, and z. FIG. 3*a* corresponds to the projection of FIG. 1 and similarly FIG. 3*b* the projection of FIG. 2. The fixed angle of the planes of laser light in relation to the camera line are shown by the letter a. Speed sensor 5 provides information on the speed v of the conveyor. With the aid of simple trigonometric functions, coordinates z, x, and y at moment $t_n$ are obtained as functions of the angles of view $\alpha$ and $\beta$.

$$z_n = \frac{H\tan(\alpha)}{\tan(\alpha) + \tan(a)}$$

$$x_n = z_n\tan(a) + vt_n$$

$$y_n = (H - z_n)\tan(\beta)$$

Once the measurement has ended, i.e. when the log has passed the photography station, a large group of coordinates have been recorded in the memory of the computer (N is, for example, 20,000 pcs, as above). The group of coordinates obtained forms the group of surface points $x_1$, $y_1$, $z_1$; . . . ; $x_n$, $y_n$, $z_n$, which form a three-dimensional model of the log and conveyor support, as well as of other interference factors.

Figures 4, 5:
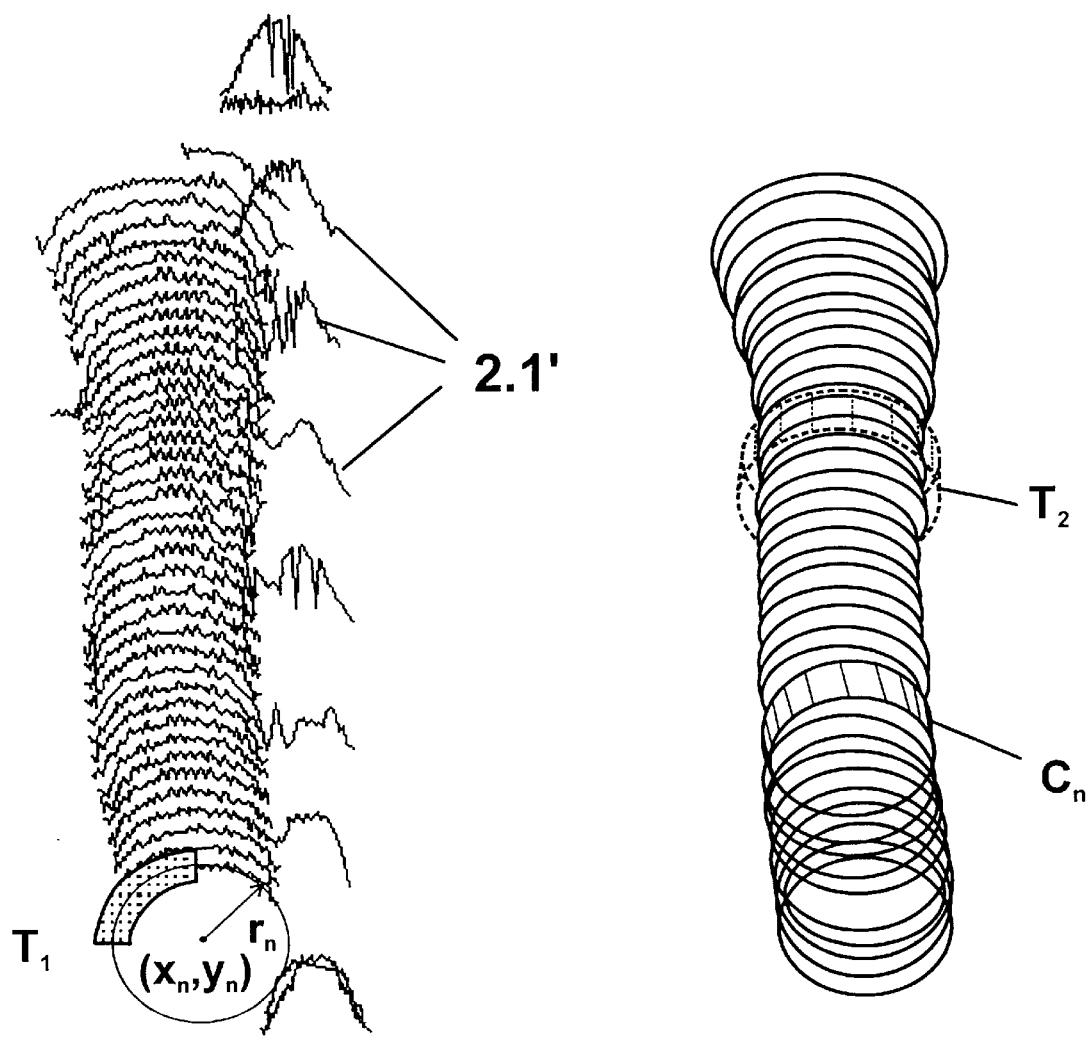
FIG. 4 shows the result of the measurement as an axonometric diagram.
FIG. 5 shows the cross-sectional circles calculated from the result of the measurement in FIG. 4.

FIG. 4 shows the result of a measurement of this kind as an axonometric diagram. After this, the points that occur in the area of the supports 2.1' are filtered out. Next subgroups $y_n$ ($x_1$, $z_1$; . . . ; $x_L$, $z_L$) in the longitudinal direction of the log are formed from the group of points. These subgroups are obtained by interpolation at regular intervals in the longitudinal direction, i.e. x, z-values for certain y-values, when they form points corresponding to each cross-section. The initial radius is obtained alternatively from the highest point, or from the difference between the firsts and last points, the latter giving the centre point with greater accuracy. With the aid of this initial circle, the points remaining outside the tolerance area $T_1$ are filtered, after which the curve of the circle is fitted more precisely to the points in the subgroup. Initially, the calculation is carried out for a small number of points and as the calculation progresses the number of points is increased. Here it is possible to use, for example, such criteria when selecting the circle and its centre point, that the sum of the squares of the distances between the circle and the points is as small as possible. These circles determine the centre point $x_n$, $y_n$ and the radius $r_n$, for each cross-section, the circles of which are shown in FIG. 5. The longitudinal cylindrical tolerance area $T_2$ is further calculated for each circle, by means of which the calculated points are removed and calculation takes place again. After this, short lengths of cylinders $C_n$, for example 5 cm, are calculated for the circles obtained, each of which depicts the log at its own location. At this stage, the number of cylinders is quite limited, but they can be used to calculate all the aforementioned characteristic quantities, except length, which has been calculated previously on the basis of the number of diameter observations.

We claim:

1. A method for measuring the characteristic quantities of a log (1), in which method the log (1) is moved at a known speed past a photographing station consisting of at least one plane of light (4.1) that transects the direction of travel of the log and a video camera (3) set at a fixed angle (a) to the direction of travel of the log, and a computer apparatus (6), which is arranged to calculate and collect sequential images of a group of surface points ($x_1$, $y_1$, $z_1$; . . . ; $x_n$, $y_n$, $z_n$) of a three-dimensional model depicting the surface of the log as the log moves through the plane of light, in which the coordinates of each point are calculated with the aid of the geometry of the photography, according to which each point formed by the plane of light (4.1) on the surface of the log (1) is at the intersection of the angle of view ($\alpha$, $\beta$) and the plane of light (4.1), the method characterized in that the log (1) is transported transversely to the direction of the conveyor as the log then travels along an imagined plane;

the plane of light (4.1) is arranged to intersect the imagined plane of movement of the log at a right-angle;

a sub-group of points ($y_n$ ($x_1$, $z_1$; . . . ; $x_L$, $z_L$)) of the cross-section at regular intervals in the longitudinal direction of the log is interpolated from the group of points ($x_1$, $y_1$, $z_1$; . . . ; $x_n$, $y_n$, $z_n$);

the radius ($y_n$; $r_n$) of the circle describing the cross-section and the location of the center-point ($y_n$; $x_n$; $z_n$) are calculated from each subgroup obtained; and calculatory sequential elements, from which the desired quantities are calculated, are formed with the aid of the circles obtained.

2. A method in accordance with claim 1, characterized in that such points are removed from the subgroup obtained as remain outside the set tolerance area ($T_1$), calculated from the auxiliary curve, which is formed by finding the maximum height and/or the maximum horizontal difference and calculating a preliminary radius and center-point for the auxiliary curve from the dimension obtained.

3. A method in accordance with claim 1, characterized in that such points are removed from the subgroup obtained as deviate from the cylinder calculated by means of the neighboring subgroup by more than the set amount ($T_2$).

4. A method in accordance with claim 1, characterized in that such points are removed from the subgroup obtained as occur in the location of moving transporting equipment, for example the carriers (2.1) of a log chain conveyor (2).

5. A method in accordance with one of claim 1, characterized in that photography starts by means of an impulse given by the transporting equipment (2, 2.1).

6. A method in accordance with one of claim 1, characterized in that photography starts/stops on the basis of an image analysis.

7. An apparatus for measuring the characteristic quantities of a log (1), which apparatus includes means (2, 2.1) for moving the log (1) past a photographing station, which photographing station includes a transportation speed sensor (5), a light source (4) for creating at least one plane of light (4.1) that transects the direction of travel of the log (1) and a video camera (3) set at a fixed angle (a) to the direction of travel of the log, and a computer apparatus (6), which is arranged to calculate and collect sequential images of a group of surface points $(x_1, y_1, z_1; \ldots; x_n, y_n, z_n)$ of a three-dimensional model depicting the surface of the log as the log moves through the plane of light (4.1), in which the coordinates of each point are calculated with the aid of the geometry of the photography, according to which each point formed by the plane of light (4.1) on the surface of the log (1) is at the intersection of the angle of view ($\alpha$, $\beta$) and the plane of light (4.1), the apparatus characterized in that, the means (2, 2.1) for moving the log (1) are arranged to transport the log transversely to the direction of the conveyor as the log thus forming an imagined plane of movement, and the plane of light (4) from the light source (4.1) is arranged to intersect the imagined plane of movement of the log (1) at a right-angle, and the video camera (3) is a so-called semi-conductor matrix camera, and the computer apparatus is further adapted to carrying out calculations, by means of which a sub-group of points $(y_n (x_1, z_1; \ldots; x_l, z_l))$ of the cross-section at regular intervals in the longitudinal direction of the log is interpolated from the group of points $(x_1, y_1, z_1; \ldots; x_n, y_n, z_n)$, and by means of which the radius $(y_n; r_n)$ of the circle describing the cross-section and the location of the center-point $(y_n; x_n; z_n)$ are calculated from each sub-group obtained, and by means of which calculatory sequential elements, from which the desired quantities are calculated, are formed with the aid of the circles obtained.

8. An apparatus in accordance with claim 7, characterized in that the apparatus includes several cameras (3) arranged in parallel, and several infrared laser light sources (4), forming two single planes of light (4.1), set symmetrically on either side of them, and that the cameras (3) are set at essentially a right-angle to the direction of movement, and that the laser light sources form an angle of 25–35° in relation to the line of photography.

9. An apparatus in accordance with claim 7, characterized in that the conveyor devices consist of a log chain conveyor (2) which is arranged to move each log (1) at a slight, 1–5° gradient, when they rest lightly against the carrier (2.1).

\* \* \* \* \*